(12) United States Patent
Guido et al.

(10) Patent No.: US 7,290,222 B2
(45) Date of Patent: Oct. 30, 2007

(54) METHODS, SYSTEMS AND COMPUTER PROGRAM PRODUCTS FOR PROVIDING TREE DIAGRAM GRAPHICAL USER INTERFACES HAVING SECONDARY EXPANSION CAPABILITIES

(75) Inventors: Patrick Rocco Guido, Cary, NC (US); Robert Charles Leah, Cary, NC (US); Paul Franklin McMahan, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 696 days.

(21) Appl. No.: 10/736,197

(22) Filed: Dec. 15, 2003

(65) Prior Publication Data

US 2005/0132304 A1 Jun. 16, 2005

(51) Int. Cl.
G06F 17/00 (2006.01)
G06F 13/00 (2006.01)
(52) U.S. Cl. ...................... 715/853; 715/841
(58) Field of Classification Search ................ 715/853, 715/854, 733, 857, 858, 825, 826, 805, 783
See application file for complete search history.

(56) References Cited

U.S. PATENT DOCUMENTS 5,701,137 A * 12/1997 Kiernan et al. ............. 715/853
6,636,250 B1 * 10/2003 Gasser ....................... 715/853
6,816,175 B1 * 11/2004 Hamp et al. ................ 715/854

* cited by examiner

Primary Examiner—Cao (Kevin) Nguyen
(74) Attorney, Agent, or Firm—David Irvin; Myers Bigel Sibley & Sajovec (57) ABSTRACT

Methods for displaying a set of hierarchical data and a set of non-hierarchical data on an electronic display comprise displaying at least part of the set of hierarchical data in a tree diagram that has a plurality of levels with one or more nodes present at each level, and displaying the set of non-hierarchical data in a plurality of auxiliary nodes that are provided in between levels of the tree diagram. Expansion handles may also be displayed adjacent nodes in the tree diagram. These expansion handles may be configured to expand or collapse the tree diagram at the node they are adjacent to. The expansion handles may optionally be configured to display or hide selected of the auxiliary nodes.

4 Claims, 7 Drawing Sheets

METHODS, SYSTEMS AND COMPUTER PROGRAM PRODUCTS FOR PROVIDING TREE DIAGRAM GRAPHICAL USER INTERFACES HAVING SECONDARY EXPANSION CAPABILITIES

FIELD OF THE INVENTION

The present invention relates generally to displaying hierarchical data on an electronic display or other display device. More particularly, the present invention relates to controlling the display of hierarchical data that is displayed on "tree diagram" graphical user interfaces.

BACKGROUND OF THE INVENTION

A wide variety of computer operating systems and computer application programs incorporate, display and/or perform operations on data or information that is hierarchical in nature. For example, most computer operating systems provide users access to a hierarchy of directories and/or sub-directories where documents, programs and/or other information are stored. Many computer e-mail systems likewise provide a hierarchy of files and/or sub-files in which e-mail messages may be stored. Organizer applications typically allow a user to establish task listings and/or store other forms of data which, once again, may be hierarchical in nature. The number and variety of computer systems and programs that store and/or manipulate hierarchical data sets continues to increase as computer processing applications proliferate.

Figure 1:
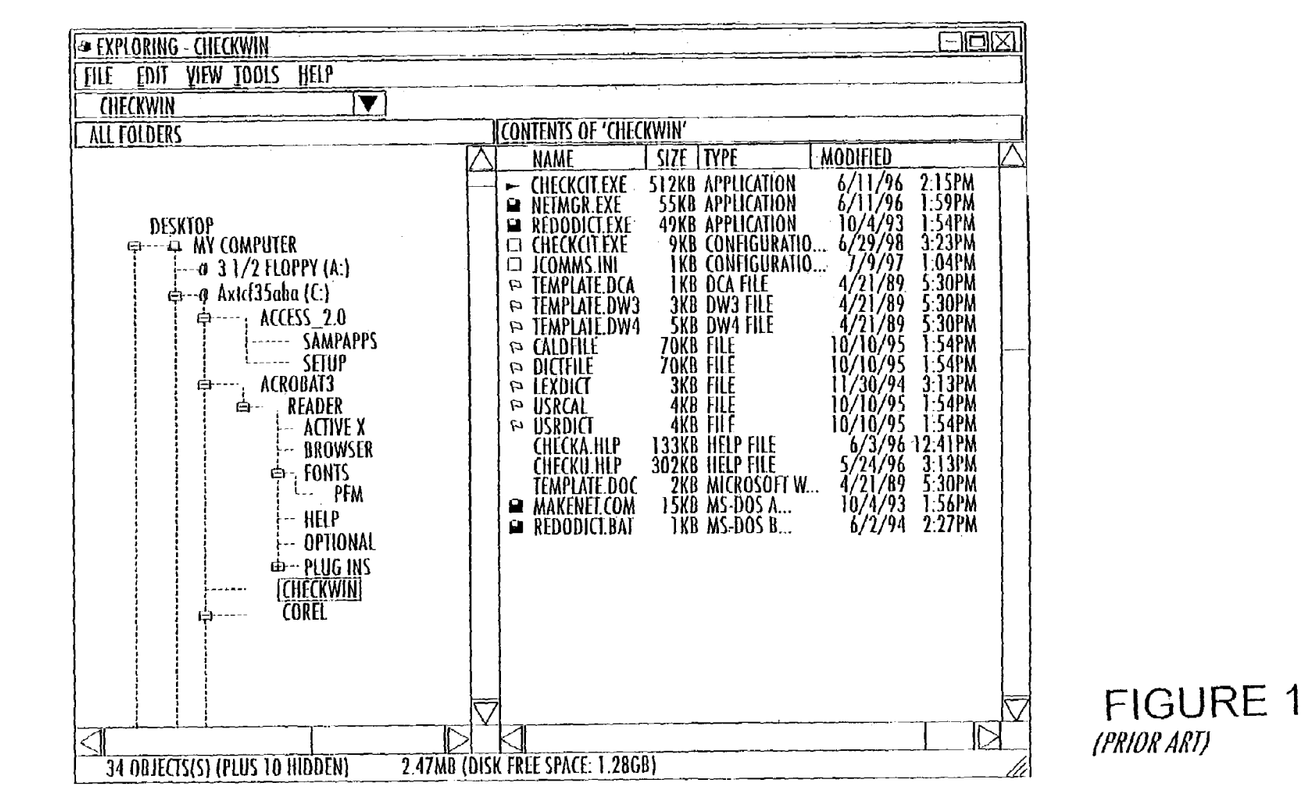
FIG. 1 is a screen capture of a conventional software program that provides a tree diagram graphical user interface.

With the advent and expanded use of graphical user interfaces over the last two decades, it has become possible to display all or part of hierarchical data sets to the user of a computer via a "tree diagram" representation. Tree diagrams are particularly useful in displaying hierarchical data as the levels of the tree diagram visually depict the location of each piece of data in a way that quickly and intuitively conveys to the user both the location of the data within the hierarchy and the relationship of that data to other data in the hierarchy. Additionally, the hierarchical structure of a tree diagram may allow the user to more quickly and efficiently peruse the data, such as by reviewing the entries at the higher levels to locate particular branches which are most likely to contain the information of interest. A user also typically can "expand" or "collapse" the tree diagram at various points (i.e., displaying or hiding information in the higher levels of the tree) to further facilitate viewing the hierarchical data. Both custom programs and tree diagram objects are known in the prior art for providing a tree diagram graphical user interface to a user. For example, FIG. 1 is a screen capture of a prior art application (Microsoft Corporation's Windows Explorer) that includes a display area containing hierarchical data displayed using a tree diagram graphical user interface.

SUMMARY OF THE INVENTION

Embodiments of the present invention provide for displaying a set of hierarchical data and a set of non-hierarchical data on an electronic display. At least part of the set of hierarchical data is displayed in a tree diagram that has a plurality of levels with one or more nodes present at each level. The set of non-hierarchical data may be displayed in a plurality of auxiliary nodes that are provided in between at least some of the levels of the tree diagram. An expansion handle may also be displayed adjacent one or more nodes in the tree diagram. These expansion handles may be configured to expand or collapse the tree diagram at the node they are adjacent to. The expansion handles may optionally be configured to also display or hide selected of the auxiliary nodes.

In embodiments of the present invention, pointing to one of the expansion handles with a pointing device while simultaneously double-clicking a control button on the pointing device operates to display or hide selected of the auxiliary nodes. In other embodiments of the present invention, pointing to one of the expansion handles with the pointing device while pressing a first button on the pointing device will operate to expand or collapse the tree diagram at the node the expansion handle is adjacent to, whereas pointing to the expansion handle while pressing a second button on the pointing device operates to display or hide selected of the auxiliary nodes. In still other embodiments of the present invention, secondary expansion handles may be displayed adjacent one or more of the nodes in the tree diagram. These secondary expansion handles may be used to show or hide selected of the auxiliary nodes.

Further embodiments of the present invention provide for displaying a set of hierarchical data and a set of non-hierarchical data in a composite diagram. This may be accomplished by displaying part of the set of hierarchical data in a first group of nodes that are arranged in a series of levels to form a tree diagram. The tree diagram may be expanded at a selected one of the nodes to display additional data in the set of hierarchical data in a second group of nodes. The selected one of the nodes may itself be expanded to display a plurality of auxiliary nodes that contain a portion of the set of non-hierarchical data. An expansion handle that is adjacent to the selected one of the nodes may be toggled to initiate the expansion of the tree diagram. In embodiments of the invention, the expansion handle may also be used to initiate the display of the plurality of auxiliary nodes. In other embodiments of the invention, a second expansion handle located adjacent the expansion handle may be toggled to initiate the display of the auxiliary nodes.

Still other embodiments of the invention provide a graphical user interface for displaying a set of hierarchical data and a set of non-hierarchical data. The graphical user interface may include a group of nodes that are arranged in a plurality of levels to form a tree diagram. The nodes in the group of nodes display at least a portion of the set of hierarchical data. The graphical user interface may further include a group of auxiliary nodes that display at least a portion of the set of non-hierarchical data. The group of auxiliary nodes may be arranged in one or more auxiliary levels that are positioned between adjacent levels of the tree diagram. One or more of the nodes in the group of nodes may have an associated expansion handle that is configured to expand or contract the tree diagram at that node and/or to display or hide selected of the auxiliary nodes.

As will further be appreciated by those of skill in the art, the various embodiments of the present invention may be embodied as methods, apparatus, systems, graphical user interfaces and/or computer program products.

DETAILED DESCRIPTION OF THE INVENTION

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, graphical user interface or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described in part below with reference to flowchart illustrations and/or block diagrams of methods, apparatus (systems) and computer program products according to embodiments of the invention. It will be understood that blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved.

Embodiments of the present invention provide for displaying both hierarchical data and non-hierarchical data on an electronic display. Many current computer applications require the manipulation and/or display of hierarchical data sets. To facilitate manipulation and navigation of such data sets, the hierarchical data is often displayed to the user in tree diagram format. Conventional tree diagrams, however, by their nature, only present data in a hierarchical format. As such, conventional tree diagrams may not be a good vehicle for displaying mixed data sets that include both hierarchical and non-hierarchical data.

By way of example, a set of hierarchical data may also include non-hierarchical data such as different versions, clones and/or duplicates of the hierarchical data. Herein, a "duplicate" refers to an item in a data set that is an exact replica of another item in the data set, whereas a "clone" refers to an item in the data set that started out as a duplicate, but subsequently was modified so that it is no longer an exact replica of the other item in the data set. A "version" refers to an item in the data set that is part of a related series of similar items that differ in some respects. Examples of items that have different "versions" are documents that have been updated (e.g., edited) one or more times or different releases of a software program.

As noted above, conventional tree diagrams typically are not designed to display non-hierarchical data such as duplicates, clones and/or versions of items that are associated with items in a hierarchical data set. Typically, these items of non-hierarchical data are depicted as "siblings" of the items in the hierarchical data set that they are associated with. Thus, for example, a duplicate of the item of data displayed at node X in the tree diagram would be depicted in a second node at the same level in the tree diagram as node X. Such a depiction, however, does not provide a graphical indication of the true underlying relationship between the duplicate and the other data in the tree diagram.

Figure 2:
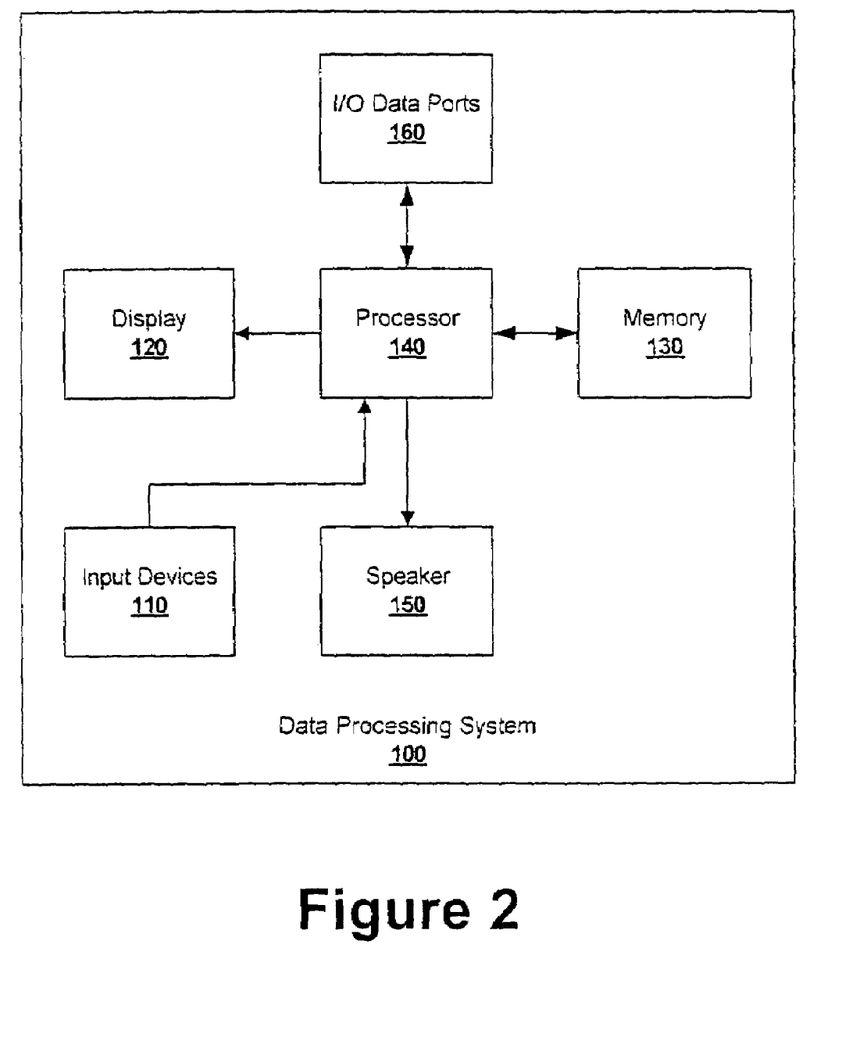
FIG. 2 is a block diagram of a data processing system suitable for use in some embodiments of the present invention.

Various embodiments of the present invention will now be described with reference to the figures. FIG. 2 illustrates an exemplary embodiment of a data processing system 100 suitable for use in implementing embodiments of the present invention. The data processing system 100 may include input device(s) 110 such as a keyboard, pointer, mouse and/or keypad, a display 120, and a memory 130 that communicates with a processor 140. The data processing system 100 may further include a speaker 150, and I/O data port(s) 160 that also communicate with the processor 140. The I/O data ports 160 can be used to transfer information between the data processing system 100 and another computer system or a network. These components may be conventional components, such as those used in many conventional data processing systems, which may be configured to operate as described herein.

Figure 3:
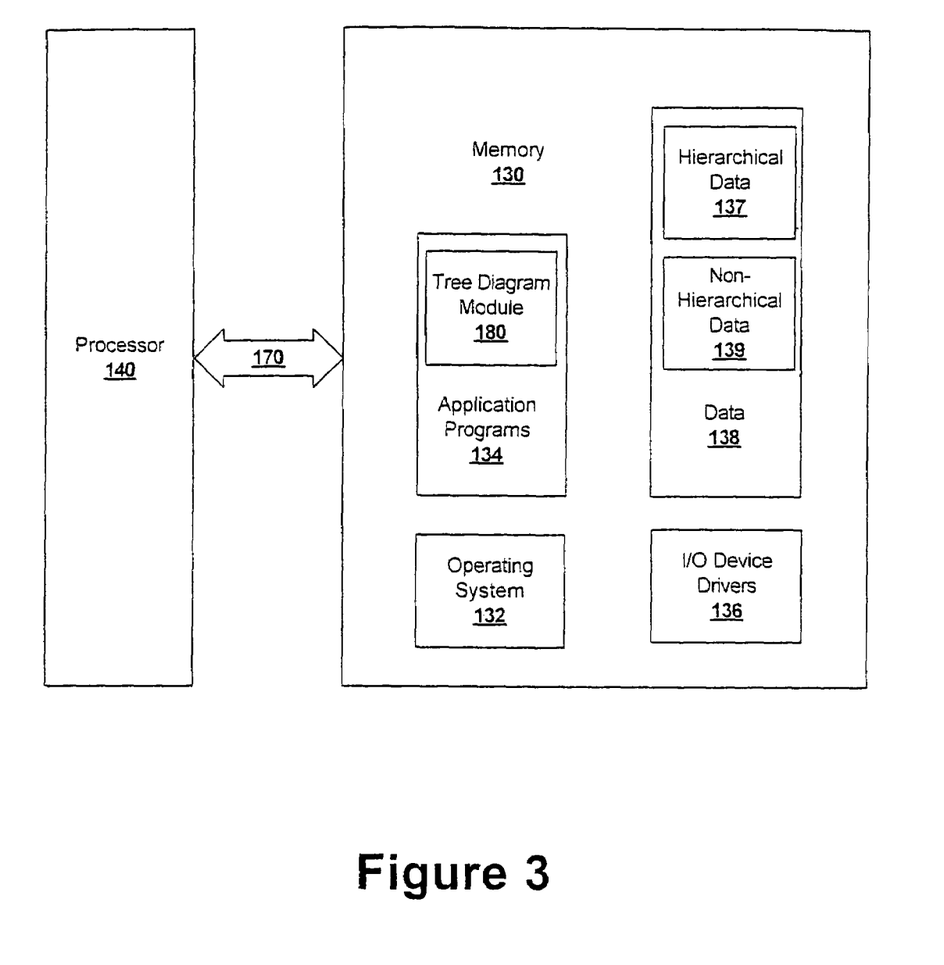
FIG. 3 is a more detailed block diagram of aspects of a data processing system that may be used in some embodiments of the present invention.

FIG. 3 is a block diagram of data processing systems that illustrates systems, methods, and computer program products in accordance with some embodiments of the present invention. The processor 140 communicates with the memory 130 via an address/data bus 170. The processor 140 can be any commercially available or custom microprocessor. The memory 130 is representative of the overall hierarchy of memory devices, and may contain the software and data used to implement the functionality of the data processing system 100. The memory 130 can include, but is not limited to, the following types of devices: cache, ROM, PROM, EPROM, EEPROM, flash memory, SRAM, and DRAM.

As shown in FIG. 3, the memory 130 may include several categories of software and data used in the data processing system 100: the operating system 132; the application programs 134; the input/output (I/O) device drivers 136; and the data 138, which may include at least one hierarchical data set 137 and at least one set of non-hierarchical data 139 that is associated with the hierarchical data set 137. As will be appreciated by those of skill in the art, the operating system 132 may be any operating system suitable for use with a data processing system, such as OS/2, AIX or System390 from International Business Machines Corporation, Armonk, N.Y., Windows95, Windows98, Windows2000 or Windows XP from Microsoft Corporation, Redmond, Wash., Unix or Linux. The I/O device drivers 136 typically include software routines accessed through the operating system 132 by the application programs 134 to communicate with devices such as the I/O data port(s) 160 and certain memory 130 components. The application programs 134 are illustrative of the programs that implement the various features of the data processing system 100 and preferably include at least one application that supports operations according to embodiments of the present invention. Finally, the data 138 represents the static and dynamic data used by the application programs 134, the operating system 132, the I/O device drivers 136, and other software programs that may reside in the memory 130.

As is further seen in FIG. 3, the application programs 134 may include a tree diagram module 180. The tree diagram module 180 may carry out the operations described herein for displaying both hierarchical data and non-hierarchical data in a tree diagram. While the present invention is illustrated, for example, with reference to the tree diagram module 180 being an application program in FIG. 3, as will be appreciated by those of skill in the art, other configurations may also be utilized while still benefiting from the teachings of the present invention. For example, the tree diagram module 180 may also be incorporated into the operating system 132, the I/O device drivers 138 or other such logical division of the data processing system 100. Thus, the present invention should not be construed as limited to the configuration of FIG. 3, but is intended to encompass any configuration capable of carrying out the operations described herein.

Figure 4:
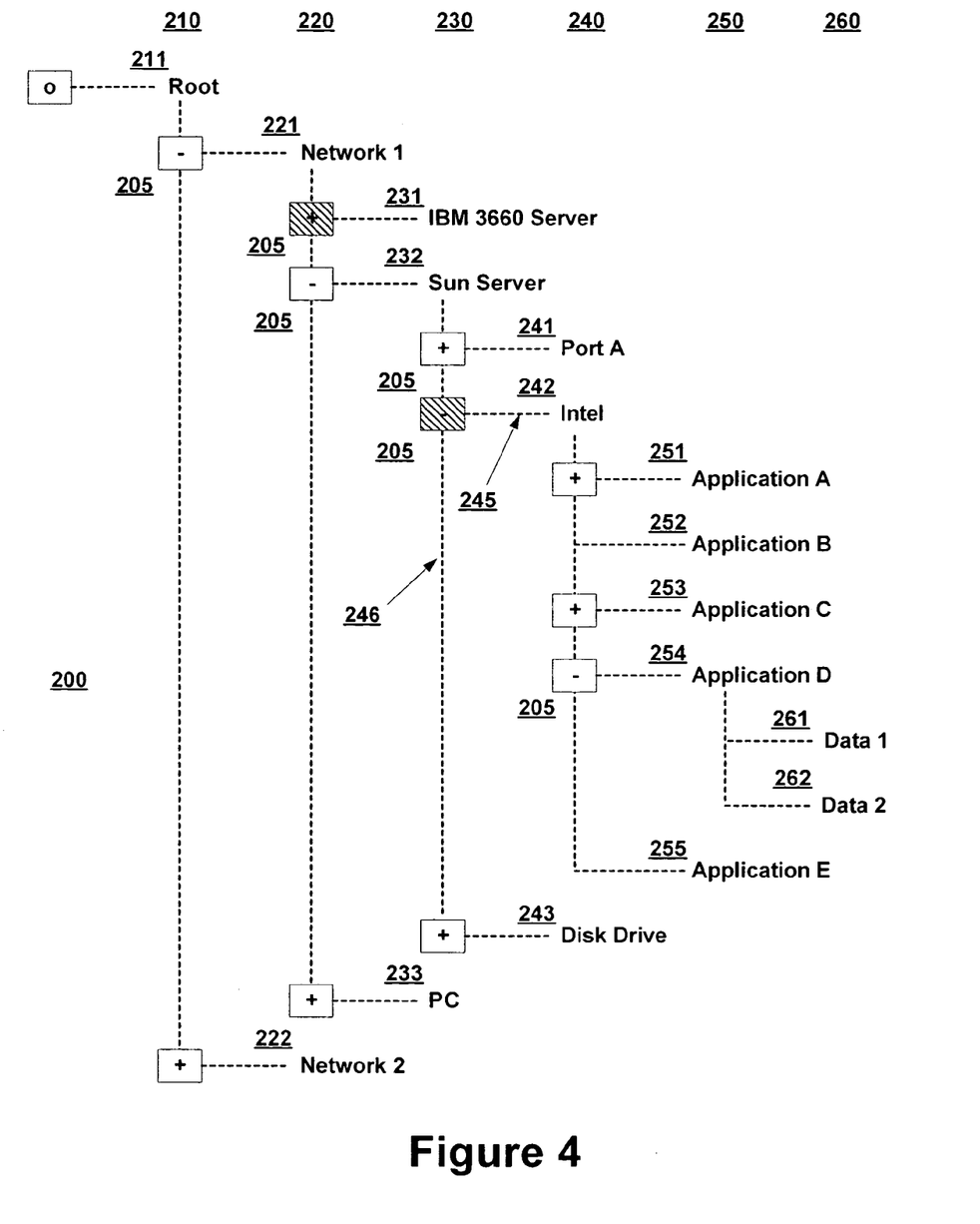
FIG. 4 depicts a display device on which a tree diagram is displayed.

As will be understood by those of skill in the art, a tree diagram refers to a display of data in which the data is arranged in a series of levels. FIG. 4 depicts an exemplary tree diagram 200 in which the data displayed in the tree diagram 200 is arranged in a series of levels 210, 220, 230, 240, 250, 260, which are physically offset from each other along the horizontal axis. The entries 211, 221-222, 231-233, 241-243, 251-255, 261-262 that comprise each level 210, 220, 230, 240, 250, 260 are referred to herein as "nodes" of the tree diagram 200. Each such node typically contains data from the set of hierarchical data, such as for example, the data "Network 1" that is displayed at node 221. The nodes 211, 221-222, 231-233, 241-243, 251-255, 261-262 are arranged in the tree diagram 200 to graphically display their hierarchical relationship with other nodes in the tree diagram 200. The nodes may also include other information, such as, for example, icons such as the "folder" icons depicted in the conventional tree diagram of FIG. 1.

In the tree diagram 200 of FIG. 4, level 210 is the lowest level of the tree diagram, and level 260 is the highest level. Conventionally, the lowest level is referred to as the "root" of the tree diagram or the "root level." The root level of a tree diagram typically, but not necessarily, includes only a single node. In FIG. 4, the root node (node 211) is positioned on the left-most side of the tree diagram 200, although other orientations may be used. As shown in FIG. 4, the nodes in the higher levels 220, 230, 240, 250, 260 branch out (either directly or indirectly) from the node 211 at root level 210, which is why these diagrams are referred to as "tree" diagrams. As is also shown in FIG. 4, the tree diagram may include horizontal and/or vertical "connectors," such as horizontal connector 245 and vertical connector 246 that help highlight the particular level in which each node falls and the particular nodes that branch out from other nodes. While these connectors are implemented as dotted lines in the example of FIG. 4, it will be appreciated that a wide variety of different connectors may be used to highlight these relationships.

A node or group of nodes that branch out from a node at a lower level of the tree diagram are referred to as "child" or "children" nodes. The node from which the child/children node branch out of is referred to as the "parent" node. For example, in FIG. 4 node 232 would be the parent of nodes 241, 242 and 243 and nodes 241, 242 and 243 would be the children of node 232. Similarly, the nodes that branch out, either directly or indirectly, from a node X at a lower level are collectively referred to as the "descendant" nodes of node X. By way of example, in FIG. 4 nodes 241, 242, 243, 251, 252, 253, 254, 255, 261 and 262 are the descendants of node 232. Likewise, a first node is referred to as an "ancestor" node of a second node if the second node branches out, either directly or indirectly, from the first node. Thus, for example, in FIG. 4 nodes 211, 221, and 232 would all be ancestor nodes of node 243.

Conventional tree diagram graphical user interfaces also typically provide capabilities to "collapse" or "expand" nodes in the tree diagram to vary the amount of information from the hierarchical data set that is actually displayed on the electronic display. Typically, the collapse and expand functions are implemented via an "expansion handle."

Herein, the term "expansion handle" is used to refer to any indicia displayed on the electronic display that a user may select to cause a node in the tree diagram to be expanded or collapsed.

In embodiments of the present invention, the tree diagrams may include expansion handles that are implemented using conventional box icons such as the box icons 205 (the box icons each have a "+" sign or a "−" sign within the box) depicted in the tree diagram of FIG. 4 (note that to simplify the drawing only a few of the box icons include the label 205). These box icons 205 may be selected by a user to cause the tree diagram graphical user interface to expand or collapse the tree diagram at the node that the box icon 205 is associated with. By way of example, in the tree diagram of FIG. 4, a user may use a pointing device such as a mouse or a stylus to select one of the box icons labeled 205. If a mouse is used as the pointing device, this may be accomplished, for example, by using the mouse to move an arrow on the electronic display screen over the box icon 205 and then single clicking the left button on the mouse. The selection of the box icon 205 causes the node to toggle between its expanded and collapsed states.

A node is considered to be "collapsed" when all the descendants of that node are hidden. In the exemplary tree diagram of FIG. 4, a "+" sign appears in the box icon 205 of a collapsed node (see, e.g., node 231). By selecting the box icon 205 with the "+" sign a user may initiate the expand function such that the tree diagram displays the children of the node at issue. Once the node has been expanded so that at least all the nodes in the next highest level are displayed, the "+" is replaced by a "−" in the box icon 205. Likewise, a "−" sign appears in the box icon 205 associated with a node that is at least partially collapsed (see, e.g., node 254). This will occur when at least the children nodes of the node at issue are displayed. By selecting one of the box icons 205 with the "−" sign a user may initiate the collapse function for the node that the box icon is associated with such that all the descendant nodes (not just the children nodes) of the node at issue are hidden from view. After the node has been collapsed the "−" is replaced by a "+" in the box icon 205. When this occurs, the node at issue may be referred to as being in a "fully collapsed" state. Functionality may also be provided that allows the user to "fully expand" a node (i.e., display all the descendant nodes of the node) in a single step, such as by, for example, using the mouse to move the arrow on the electronic display screen over the box icon 205 for the node and then double clicking the left button on the mouse.

Embodiments of the present invention provide methods, systems and computer program products for displaying both hierarchical and non-hierarchical data in a tree diagram graphical user display. In certain embodiments of the present invention, this may be accomplished by including additional "auxiliary" levels in between the levels of a conventional tree diagram that display non-hierarchical data associated with the hierarchical data resident at particular nodes in the tree diagram.

Figure 5A:
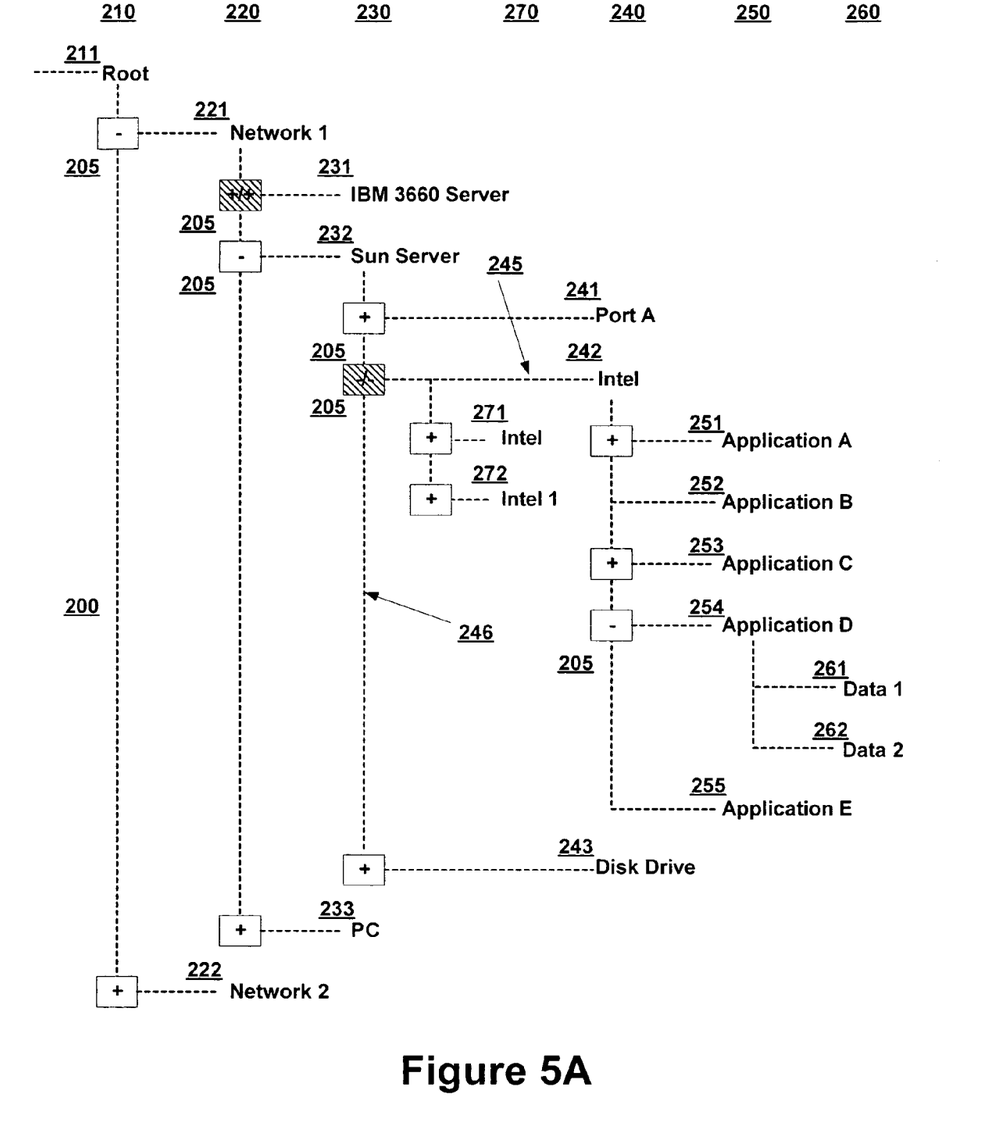
FIG. 5A depicts a display device on which a tree diagram graphical user interface according to the embodiments of the present invention is displayed.

FIG. 5A depicts an exemplary tree diagram graphical user interface according to embodiments of the present invention. The tree diagram of FIG. 5A is identical to the tree diagram of FIG. 4 except that (a) it includes the additional "auxiliary" level labeled 270 that includes non-hierarchical data and (b) two of the box icons 205 have an altered appearance. In the example depicted in FIG. 5A, the non-hierarchical data included at level 270 comprises a duplicate ("Intel 1") of the hierarchical data item "Intel" contained in node 242. To display this non-hierarchical data in the tree diagram, the additional level 270 is provided that includes a node 271 that repeats the hierarchical data (i.e., "Intel") contained in node 242 and a second node 272 that includes the non-hierarchical, duplicate entry (i.e., "Intel 1").

As shown in FIG. 5A, the auxiliary level 270 falls between levels 230 and 240, each of which contain nodes that display part of the set of hierarchical data. It will be appreciated that the auxiliary level 270 could alternatively be located at other locations on the electronic display, such as, for example, between levels 240 and 250. In the exemplary embodiments of the present invention depicted in FIG. 5A, the nodes resident at level 270 (nodes 271 and 272) are located to align vertically with a horizontal connector 245 that connects node 242 to the box icon 270 associated with node 242, whereas with levels 220, 230, 240, 250 and 260 the nodes are located to align vertically with the box icon 270 associated with the nodes on the next highest level. In this manner, a user viewing the tree diagram 200 can easily determine which data comprises hierarchical data and which data comprises non-hierarchical data.

In some embodiments of the present invention, a user may be provided the capability to hide or display selected of the non-hierarchical data. Herein, the operation of displaying the non-hierarchical data associated with a particular node in the tree diagram is referred to as "expanding the node," while the operation of hiding the non-hierarchical data associated with a particular node in the tree diagram is referred to as "collapsing the node" to distinguish these operations from the conventional operations of expanding or collapsing the tree diagram at a node to display or hide nodes at higher levels of the tree. In certain embodiments of the present invention, the expansion handles 205 may be used to expand or collapse the node. For instance, the tree diagram graphical user interface could be configured such that when a user pointed to the expansion handle associated with node X with a mouse arrow and double-clicked the left mouse button, the nodes located in the auxiliary level associated with node X would toggle between being hidden or displayed. In alternative embodiments of the present invention, a node containing non-hierarchical data could be expanded or collapsed by pointing to the node with a mouse arrow and clicking the right mouse button. Numerous other implementations are possible.

As shown in FIG. 5A, in embodiments of the present invention in which an expansion handle that is used to expand or collapse levels of the tree diagram that include hierarchical data is also used to display/hide non-hierarchical data, the expansion handle may be given a modified appearance on the electronic display to alert the user of this expanded functionality. For example, the icon or other indicia used to denote the expansion handle may have a different shape, color, pattern, etc. than other expansion handles in the tree diagram that do not have this additional functionality (i.e., the expansion handles at nodes that do not have any associated non-hierarchical data). This modified appearance is denoted in FIG. 5A by the cross-hatching of the box icons 205 associated with nodes 231 and 242 (the nodes that have associated non-hierarchical data). It will also be understood that the color, shape or other characteristics of the data contained in a node could be modified to visually indicate that a node in the tree diagram has associated non-hierarchical data.

As is also shown in FIG. 5A, in certain embodiments of the present invention, the modified appearance may include placing multiple "+" and/or "−" symbols within the box icon 205, the first of which visually describes the collapsed/expanded state of the tree diagram 200 at the node at issue and the second of which visually describes the collapsed/ expanded state of the node itself (i.e., whether or not the non-hierarchical data is displayed or hidden). Thus, for example, in FIG. 5A the expansion handle associated with node 242 has a "−/−" symbol, where the first "−" symbol indicates that the tree diagram is in an expanded state at node 242 (i.e., the children nodes 251-255 are displayed), and the second "−" symbol indicates that node 242 itself is expanded to display the non-hierarchical data (node 272) associated with node 242. Similarly, the expansion handle associated with node 231 has a "+/+" symbol, where the first "+" symbol indicates that the tree diagram is in a collapsed state at node 231 (i.e., the children of node 231 are not displayed), and the second "+" symbol indicates that node 231 itself is in a collapsed state (i.e., there is non-hierarchical data associated with node 231 that is hidden on the display). Although not pictured in FIG. 5A, expansion handles could similarly include a "+/−" symbol for nodes where the tree diagram is collapsed at the node, but the node itself is expanded or a "−/+" symbol for nodes where the tree diagram is expanded at the node, but the node itself is collapsed.

Figure 5B:
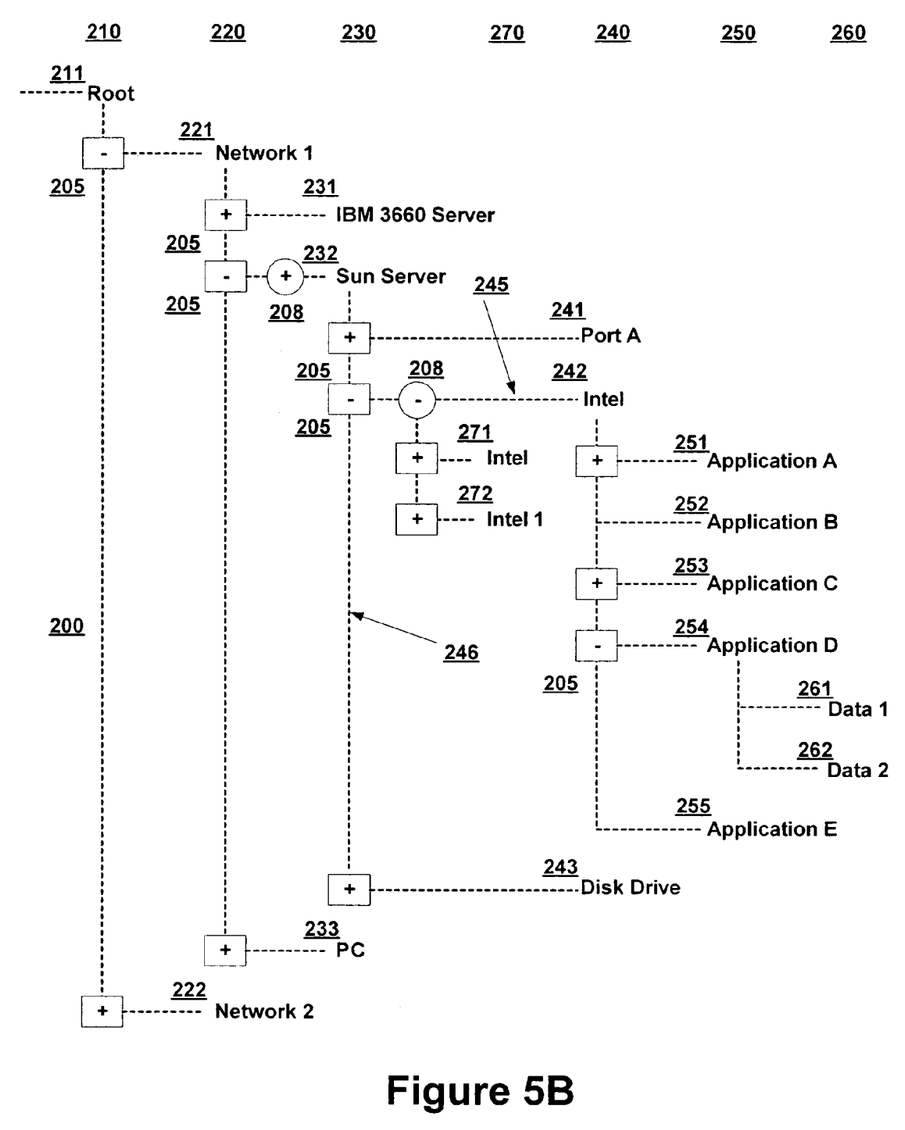
FIG. 5B depicts the display device on which a tree diagram graphical user interface according to further embodiments of the present invention is displayed.

In other embodiments of the present invention, secondary expansion handles may be provided that may be used to expand/collapse nodes that contain non-hierarchical data. FIG. 5B depicts a simple example of such an embodiment of the present invention. As shown, in FIG. 5B, a secondary expansion handle 208 is provided at each node in the tree diagram 200 that contains non-hierarchical data (i.e., nodes 231 and 242). These secondary expansion handles 208 may conveniently be provided to the right of the expansion handles 205, although the present invention is not limited to any particular location. Each secondary expansion handle 208 is associated with a particular node in the tree diagram and may be designed to allow a user to toggle between displaying and hiding the non-hierarchical data associated with the particular node. The secondary expansion handles 208 may have the same or a different appearance as compared to the expansion handles 205.

As discussed above, in the tree diagram graphical user interfaces of FIGS. 5A and 5B, expanding a node that contains non-hierarchical data such as, for example, node 242 results in the display of a new level (level 270) that contains a node (node 271) depicting the hierarchical data that is contained at the node that was expanded (node 242) and one or more additional nodes (node 272) that contain the non-hierarchical data. It will be appreciated that it is not necessary that the auxiliary level 270 contain a node (node 271) that displays the hierarchical data. The tree diagram user interfaces of the present invention may be programmed or otherwise constructed to display this information, to not display this information, or to allow the user to selectively or globally choose between the two options.

As shown in FIGS. 5A and 5B, the non-hierarchical data associated with a particular node (e.g., the data contained in node 272) may itself have embedded in it hierarchical data. For instance, in the example depicted in FIGS. 5A and 5B, the non-hierarchical data associated with node 242 is a duplicate of node 242. This duplicate entry is displayed at node 272. As node 242 has a plurality of descendant nodes (nodes 251-255 and 261-262), node 272 likewise has the same descendant nodes. Accordingly, node 272 (and node 271) has its own expansion handle 205 which allows a user to expand/contract node 272 to hide or display these descendant nodes. It will also be appreciated that, in other instances, the non-hierarchical data may include descendant nodes that contain different data. For instance, if node 272 contained a different version of node 242 as opposed to containing a duplicate of node 242, then the data contained in the descendant nodes to node 272 might differ from the data contained in nodes 251-255 and 261-262.

An exemplary application in which tree diagram user interfaces according to embodiments of the present invention may be used is in application and/or resource monitoring systems that automatically or semi-automatically monitor resources in, for example, computer networks. Various resource monitoring systems include the capability to automatically search the network or networks that are to be monitored to create a map of the resources contained within the network. In many instances, this map comprises a collection of hierarchical data that depicts the different networks, involved, the servers and other hardware in each network, individual components on the identified hardware (e.g., disk drives, memory devices, processors, etc.), individual ports associated with the hardware and/or components, application software and data packages resident on the hardware and components, etc. In performing this mapping, the resource monitoring system may identify numerous duplicate entries such as hardware or components that have different names or network addresses that the resource monitoring system is able to identify as corresponding to a single physical piece of equipment. the mapping may also identify clones, such as duplicate applications that were modified for some reason. The mapping may further identify multiple versions of various network components such as, for example, multiple versions of a software application that are resident on a network server. There may also be different versions for various topologies within the mapping. These identified duplicates, clones and versions generally are difficult to display in a conventional tree diagram because without providing misleading information regarding the hierarchical relationship between the duplicates, clones and versions and other data in the tree diagram.

In addition to providing an enhanced visual depiction, the tree diagrams according to embodiments of the present invention may also provide for quicker searching and quicker pruning of the tree diagram, and may also provide a more natural way to provide multi-versioning in a data model. For example, a variety of algorithms exist that may be used for searching hierarchical data contained within conventional tree diagrams. These algorithms are not configured to operate on auxiliary levels/nodes embedded in the tree diagram that include non-hierarchical data. Thus, when tree diagrams according to embodiments of the present invention are input to these algorithms, only the hierarchical data will be searched. In certain instances, a user may only be interested in searching the hierarchical data. As such, embedding the non-hierarchical data in auxiliary nodes/ levels of the tree diagram according to embodiments of the present invention can actually result in a simpler, faster search, as the search algorithm will ignore the non-hierarchical data stored in the auxiliary nodes. Likewise, algorithms also exist that automatically delete and/or modify data stored at nodes in tree diagrams. In conjunction with the tree diagram graphical user interfaces of the present invention, these algorithms could be modified to save prior versions of the tree diagram instead of deleting and/or writing over the data in the previous version. The string of different versions of the tree diagram may be stored within the tree diagram itself as non-hierarchical data entries in the tree diagram.

Figure 6:
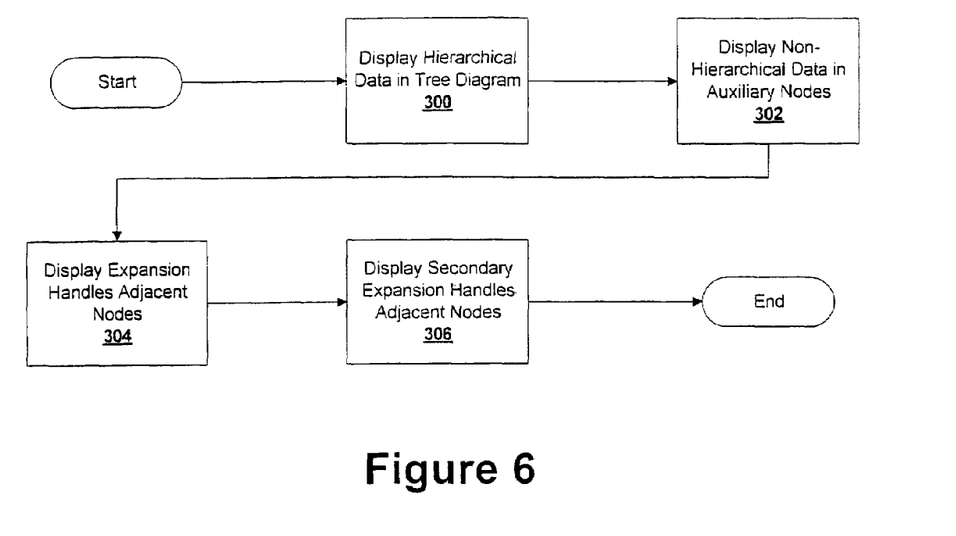
FIG. 6 is a flowchart depicting operations according to some embodiments of the present invention.
Figure 7:
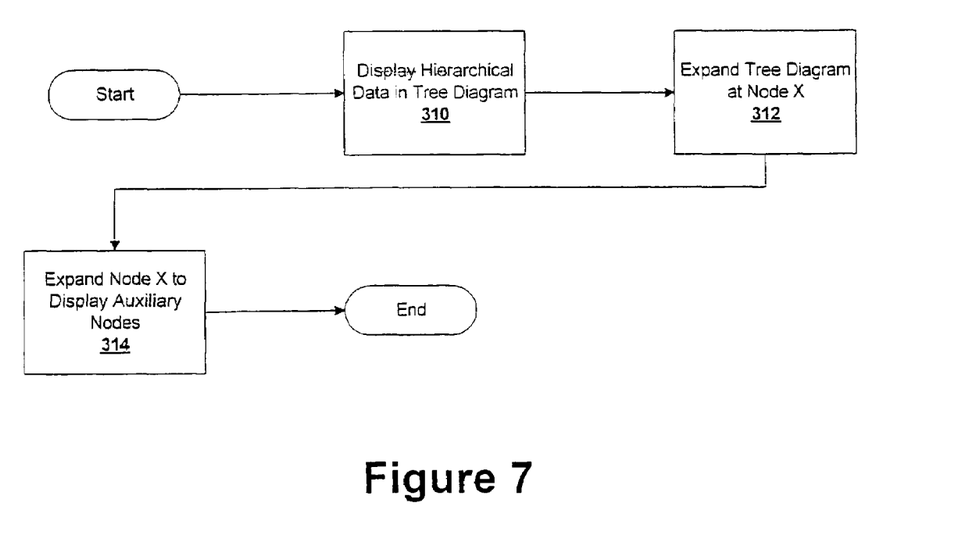
FIG. 7 is a flowchart depicting operations according to further embodiments of the present invention.

FIGS. 6 and 7 are flowchart illustrations that depict operations for displaying both hierarchical data and non-hierarchical data in a tree diagram graphical user interface pursuant to embodiments of the present invention. As shown in FIG. 6, in one such embodiment at least part of a set of hierarchical data is displayed on the electronic display in a tree diagram that has a plurality of levels with one or more nodes present at each level (box 300). A set of non-hierarchical data is also displayed on the electronic display in a plurality of auxiliary nodes that are provided between at least some of the plurality of levels of the tree diagram (box 302). An expansion handle may also be displayed adjacent one or more nodes in the tree diagram, where the expansion handle is configured to expand or collapse the tree diagram at the node the expansion handle is adjacent to (box 304). A secondary expansion handle may optionally be displayed adjacent one or more nodes in the tree diagram, wherein the secondary expansion handle is configured to show or hide selected of the auxiliary nodes (box 306).

As shown in FIG. 7, pursuant to other embodiments of the present invention, a set of hierarchical data and a set of non-hierarchical data may be displayed in a composite diagram by displaying a first part of the set of hierarchical data in a first group of nodes that are arranged in a plurality of levels to form a tree diagram (box 310). The tree diagram may be expanded at one of the first group of nodes to display a second part of the set of hierarchical data in a second group of nodes that descend from the node where the expansion occurred (box 312). The node where the expansion was performed may itself be expanded to display a group of auxiliary nodes that contain a portion of the set of non-hierarchical data (box 314). This may be accomplished by, for example, toggling an expansion handle that is adjacent to the node or by toggling a secondary expansion handle.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A graphical user interface for displaying a set of hierarchical data and a set of non-hierarchical data, comprising:
   a plurality of nodes that display at least a portion of the set of hierarchical data, wherein the plurality of nodes are arranged in a plurality of levels to form a tree diagram;
   a plurality of auxiliary nodes that display at least a portion of the set of non-hierarchical data, wherein the plurality of auxiliary nodes are arranged in one or more auxiliary levels that are positioned between adjacent levels of the tree diagram;
   a plurality of expansion handles, wherein each of the plurality of expansion handles is associated with one of the plurality of nodes and is configured to expand or contract the tree diagram at the respective one of the plurality of nodes; and
   a secondary expansion handle that is located between two adjacent ones of the plurality of expansion handles, wherein the secondary expansion handle is associated with one of the plurality of auxiliary nodes and is configured to display or hide the one of the plurality of auxiliary nodes.

2. The graphical user interface of claim 1, wherein each of the plurality of expansion handles comprises a first type of icon and wherein the secondary expansion handle comprises a second type of icon that is different than the first type of icon.

3. The graphical user interface of claim 1, further comprising a plurality of horizontal connectors, wherein at least some of the plurality of nodes comprise one of the plurality of expansion handles and a data entry connected by a respective one of the plurality of horizontal connectors.

4. The graphical user interface of claim 1, wherein the secondary expansion handle is on or adjacent to one of the plurality of horizontal connectors.

* * * * *